US008818756B1

(12) United States Patent
Keenan et al.

(10) Patent No.: US 8,818,756 B1
(45) Date of Patent: Aug. 26, 2014

(54) METHOD AND APPARATUS FOR PREDICTING PROJECT OUTCOMES

(75) Inventors: Perry Keenan, Auckland (NZ); Kathleen Conlon, Sydney (AU); Alan Jackson, Auckland (AU)

(73) Assignee: The Boston Consulting Group, Inc., Boston, MA (US)

( * ) Notice: Subject to any disclaimer, the term of this patent is extended or adjusted under 35 U.S.C. 154(b) by 101 days.

(21) Appl. No.: 11/098,249

(22) Filed: Apr. 4, 2005

Related U.S. Application Data

(63) Continuation of application No. 09/845,868, filed on Apr. 30, 2001, now abandoned.

(51) Int. Cl.
*G06F 17/18* (2006.01)
(52) U.S. Cl.
USPC ............ 702/181; 702/179; 702/182; 702/183
(58) Field of Classification Search
USPC ........ 702/179, 181, 182, 183; 705/1, 7–9, 50; 706/16, 21, 25, 46, 47, 50, 54, 55, 61; 703/2
See application file for complete search history.

(56) References Cited

U.S. PATENT DOCUMENTS

| | | | |
|---|---|---|---|
| 6,317,700 B1 * | 11/2001 | Bagne ............................ | 702/181 |
| 6,381,610 B1 | 4/2002 | Gundewar et al. | |
| 6,901,346 B2 * | 5/2005 | Tracy et al. .................... | 702/181 |

OTHER PUBLICATIONS

Chimka et al., 'Graphical Representation of Engineering Design Behavior', 2000, UOP Publication, pp. 1-7.*
Chimka et al., 'Graphical Representation of Engineering Design Behavior', 2000, UOP Publication, pp. 1-6.*
Avritzer et al., 'Investigating Metrics for Architectural Assessment', 1998, IEEE Publication, pp. 1-7.*
Alder, Michael USA: Avoiding the Perils of Imaging System Implementations, UMI, ARMA Records Management Quarterly (2000).
Angus, Jeff, USA: Enterprise Project Acts Like A Business-Intelligence Tool, Sorting the Right People for each Job, InformationWeek, Feb. 7, 2000.
Beer et al. "Cracking the Code of Change" Harvard Business Review, May-Jun. 2000.
Bertnick Smith, Michelle. "Project Management Software Advance with a New System Category," Manufacturing Systems, Apr. 1, 1999.
Bimbaum et al. "Abstract: Managing Academic Interdisciplinary Research Projects" Decision Sciences, vol. 10, No. 4, pp. 645-665 (1979).
Brown, Chappell "USA: Websites Offer Distributed Software Tools," Electronic Engineering Times (2001).

(Continued)

*Primary Examiner* — Elias Desta
(74) *Attorney, Agent, or Firm* — DLA Piper LLP US

(57) ABSTRACT

A method and apparatus are provided for predicting the outcome of a project and, if needed, increasing its likelihood of success. Numerical values are assigned to a set of predetermined factors affecting the outcome of the project. The values are assigned based on a subjective evaluation of each factor with respect to the project. The factors include the duration of the project, the performance integrity of persons involved in implementing the project, the perceived commitment of senior management to the project, the local commitment to the project and the effort required to implement the project. A score is calculated based on the values assigned to the factors. The score is applied to empirical data on prior project outcomes and scores to determine the probability of success of the project. If desired, project changes can be implemented and new values assigned to one or more factors to improve the score and increase the probability of success of the project.

24 Claims, 3 Drawing Sheets

(56) References Cited

OTHER PUBLICATIONS

Brown, Judy, USA: Project 2000 Improves Sharing of Information, UMI, Milwaukee Journal Sentinal May 15, 2000.
Brown et al., "Abstract: Project Performance and the Liability of Group Harmony" IEEE Transactions on Engineering Management, vol. 37, No. 2, pp. 117-125 (1990).
Bushell, Sue Australia: E-Commerce Projects—Management at the Speed of Light, IDG DTA 2000.
Canada: BrandEra.com Upgrades Medialot Project Management Tool with More than 60 Enhancements, Canada Newswire Jun. 13, 2000.
Connolly, PJ, USA: Building Better Apps for Your Business Via Thorough Testing, UMI, InfoWorld (2000).
Cooper, Robert G. "Abstract: Selecting Winning New Projects: Using the NewProd System," Journal of Product Innovation Management, v2nl, pp. 34-44 (1985).
Craig, USA: Use Web Software for Projects or Die, Contractor (2000).
Dickey, Sam, USA: No Time for Quality Trade-Offs-Strong Project Management Is Essential Before Tackling Large Development Tasks, Information Week, Apr. 10, 2000.
Doherty, Paul, USA: Project Management for the New Economy—Primavera Project Planner Upgrade Offers New Tools for Experienced Project Managers, Information Week, Oct. 25, 1999.
Dominic Helps, UK: Legal-Fatal Beauty, MS Presswire (2001).
Drucker, David, USA: Project Management Apps Get InterActive, TechWeb News, Feb. 4, 2000.
Dugan, Sean M. USA: Should You Implement A Project Management Solution? UMI, InfoWorld, Jan. 31, 2000.
Dunn, Darrell "USA: Tality Rides Outsourcing Wave—Cadence Spinoff Finds Outlet Through SCI" Electronic Buyer's News (Jan. 29, 2001).
Dysert et al., "Abstract: USA: The Organization of an Estimating Department" UMI Cost of Engineering, A Publication of the American AS 2000.
Elangkoh, Ravi "Role of Project Managers" New Straits Times, P10 (2000).
Elangkoh, "Malaysia: Effective Project Management" New Straits Times, p. 10 (2000).
Ericson, Glenn, USA: Should Old Acquaintance Be Forgot?, UMI, Midrange Systems, Dec. 13, 1999.
Feibus, Andy "Project Leaders", Information Week, p. 1A, 3A-10A (1998).
Fielden, Tim, USA: MKS Expertly Tracks Changes, UMI, InfoWorld, Jan. 10, 2000.
Floricel et al. "Innovative Contractual Structure for Interoganizational Systems" International Journal of Technology Management, Jan. 1, 1998.
German, "USA: Balance Your Project (Financial Management Strategies" Information Access Company, All rights reserved. IAC Tede and Industry Database, Government Financial Review, p. 15 (2000).
Gilbert, Algorie, USA: Online Project Management Planned-Dow-Anderson Consulting Venture Aims to Simplify Product-Development Communication, InformationWeek (2000).
Gutierrez et al "Abstract: Parkinson's Law and its Implications for Project Management," Management Science, vol. 37, No. 8 pp. 990-1001 (1991).
Harding, Elizabeth "Building MIS into Business Plan: Firms Look to Implement Enterprise Model" Software Magazine, vol. 10, No. 12, pp. 23-26 (1990).
Harvard Management Update "How Does Change Management Need to Change?" Jan. 2001.
Heck, Mike, USA: Project Portal Boosts Productivity, UMI, Infoworld, May 1, 2000.
Heytens, Annella, "China: Seeking Seamless Integration" Business Weekly (2001).
Horwitt, Elisabeth, USA: Hands-Off Management, UMI, Network World, (2000).
Howe, Charlie "Abstract: Good Surprises Do Come in Small Packages", PM Network, vol. 14, No. 1, pp. 29-30 (2000).
India: ms India Unveils Project Management Tool, Computers Today p. 12 2000.
India: Management by Wandering Around, Economic Times, Aug. 23, 1999.
Jaleshgari, Ramin P. USA: Project Watchers—Cognizant Tools Automate Monitoring, InformationWeek, Aug. 23, 1999.
Jick, Todd "Note: The Challenge of Change" Harvard Business School, Note 9-490-016, (1990).
Jick, Todd. "Implementing Change" Harvard Business School, Note 9-491-114 (1991).
Johnson, Jim "USA: Chaos in Success" Software Magazine, vol. 19, No. 3, (1999).
Kosan, Lisa USA: Keeping Track of Details—Tools Help Enterprises of any Size Stay on Course, PROMT p. 61 2000.
Kotler, John. "Leading Change: Why Transformation Efforts Fail" Harvard business Review, Mar.-Apr. 1995.
Laisern, Jerry. USA: Collaborative AEC Design. (Technology Information), PROMT, p. 10 (2000).
Lam, Michael, Malaysia: A Good System Gives All Advantages of 'Change Agent', Business Times (Malaysia), Mar. 17, 2000 p. 14.
Laszlo, George. "USA: Is There Life After Simultaneous Submissions?" UMI, Pharmaceutical Executive (2001).
Levine, Bernard, "USA: EMS Deal Zeal Still Hot" UMI, Electronic News, (Jan. 29, 2001).
Lynn et al., "Market Forecasting for High-Tech vs. Low-Tech Industrial Products" Engineering Management Journal, Mar. 1, 1998.
Mah Chor Kiat, Asia: E-Business-Project Management Methods and Techniques, LAN Magazine, Sep. 1999 p. 34.
McMullan, Leslie "Cost Forecasting—Beyond the Crystal Ball" Transactions of AACE International (1996).
Mitchell et al. "USA: Easing the IT Management Burden With Professional Services Automation" UMI InfoWorld (2000).
Mitchell et al. USA: Test Center Comparison—Web-Based Project Management Project Meets Portal, UMI, InfoWorld Jan. 31, 2000.
Mitchell, Lori, USA: WelcomHome Helps Project Staff Succeed, UMI, InfoWorld, 2000.
Moore et al. "Can Project Success and Failure Be Predicted?" Hydocarbon Processing, vol. 79, No. 2, pp. 55.
North America: Infrastructureworld.com launches new era in project development, Asia Pulse, 2000.
North America: Industria Launches First Global Project and Procurement Network, Asia Pulse, 2001.
Pinto et al. "Abstract: Critical Factors in Successful Project Implementation" IEEE Transactions on Engineering Management, vol. EM-34nl, pp. 22-27, (1987).
Prabhakar, Sinha "India: Microsoft ropes in TCS for Software Development" (2001).
Ricadella, Aaron, USA: Microfsoft Upgrades Project-Management Tools—Update and Companion Project Designed to Open Category to a Wider Audience, Information Week, Nov. 22, 1999.
Riggs et al., "A Decision Support System for Predicting Project Success" Project Management Journal, vol. XXII, No. 3 (1992).
Roberti, Mark, USA: Online Construction Giants Cement Deal, thestandard.com (2000).
Scott, Karyl "USA: Consultants Need Not Apply" Informationweek, Reuters Business Briefing, (2001).
Senge et al. "Creating Change" Executive Excellence, Oct. 2000.
Shipley et al. "Abstract: A Fuzzy Logic Approach for Determining Expected Values: A Project Management Application" Journal of the Operation Research Society, vol. 27, No. 4, pp. 562-569 (1996).
Smith, Mark, USA: The Staggering Variety of Prepress Workflows Overwhelms Providers, PROMT, p. 1, 2000.
"Sterling Software Announces Key: Advise; New Hypermedia Methodology Include BPR and Client/Server Guidelines for Predictable and Successful Applications Development" Business Wire, Apr. 17, 1995.
Switzerland: A New Piece of Software Shows Which Bits of an Organization are Talking to Each Other, Economist, (2001).
Thompson, Robert, USA: More Heads Better than One in Project Management, UMI, Computing Canada, Dec. 10, 1999.

(56) References Cited

OTHER PUBLICATIONS

Trepper, USA: Getting An Edge on the Competition, Information Week, 2000.
UK: Microsoft—Microsoft Collaborates with Arthur Andersen, Avanade and KSolutions, furthering adoption of . . . , M2 Presswire (2001).
UK: Princeton Softech—Princeton Softech releases Process Director TM—"Active Mentoring" helps enhance . . . , MS Presswire (2001).
UK: Flocking Together, Corporate Insurance and Risk (2000).
UK: Prime Learning.com Receives Excellent Rating from Lguide, Business Wire (2001).
UK: Enterprise-Bulletin—IBM Heralds SCLM Software, Computing, p. 36 2000.
UK: Havas-Havas Launches Build-Expert—The First European Network of Portals for the Building Industry, M2 Presswire (2000).
UK: Seamless Transition—The Psychology of Change—How to Avoid Getting Millions of Helpdesk Calls, Computer Weekly (2000).
UK: Infrastructureworld.com Launches New Era in Project Development, PR Newswire, 2000.
UK: Asta Development—Internet Enabled Programme Management for the 21st Century, M2 Presswire, Nov. 26, 1999.
UK: Project Management—Managing Projects in a Changing World, International Water Power and Dam Construction, p. 39 (2000).
UK: Primavera Systems—SureTrak Project Manager From Primavera Named as PC Computing Award Finalist, M2 Presswire, Nov. 8, 1999.
UK: True Partnering The Only Way Forward, Summit 2000, Building Services Journal, Apr. 2000 p. 7.
UK: Epicor e-Project for SMEs, Computer Reseller News (UK) p. 4 (2001).
USA: Primavera Systems—TeamPlay Project Management for Software Developers Opens Flagship Office, M2, Presswire (2000).
USA: WorkPlaceUSA and Citadon Announce Largest Internet Facility Project in History, PR Newswire (2001).
USA: ESPN Expands Its Use of Avid Systems at the Winter X Games, Business Wire (2001).
USA: Healthlink and i.s.edge Announce Partnership, Business Wire (2001).
USA: Witness Systems Launches Industry-first Online Implementation Methodology, MS Presswire (2001).
USA: PrimeLearning.com Receives Excellent Ratings from Lguide, Business Wire (2001).
USA: Cushman & Wakefield Merges to Form Struxicon Interiors, IAC Trade and Industry Database, Real Estate Weekly, p. 27 (Jan. 30, 2001).
USA: Cushman & Wakefield and Struxicon to Co-Develop Struxicon Interiors, Business Wire (Jan. 29, 2001).
USA: Cataligent Launches Company at Web-Enabled Project Management Conference in San Francisco, PR Newswire (2001).
USA: Witness Systems Launches Industry-First Online Implementation Methodology, Business Wire, (2001).
USA: SCI Systems and Tality Strike Strategic Agreement, Business Wire, 2001.
USA: Eleris Launches Dedicated RosettaNet Business Practice to Help Clients Streamline Supply Chain, Business Wire, (2000).
USA: NxN Software Releases Software Upgrade for Interactive Entertainment Industry, PR Newswire (2001).
USA: Watching the Front Door, Credit Union Accountant, C/C Jan. 1998, p. 34 (2001).
USA: Outsourcing for PC/LAN Support, Installation and Acquisition of H/W and S/W, Commerce Business Daily (2000).
USA: HealthFlash Signs Passport as Distributor of Internet Based Hospital and Payor Accreditation Applications, Business Wire (2000).
USA: Discounted Project Management Report Now Available, Internet Wire (2000).
USA: Hosted Project Management, InformationWeek (2000).
USA: OpenAvenue Acquisition of Mmiradi Inc. Extends Colloborative Development Infrastructure, PR Newswire (2000).
USA: Two-Thirds of Companies Using Project Management Say Strongest Benefit is Increased Productivity, PR Newswire 2000.
USA: Fullscope and onProject.com Partner to Bring Collaborative Project Management to Vertical Markets, PR Newswire, 2000.
USA: Project Management Tools and Techniques Workshop and Project Leadership, Commerce Business Daily, 2000.
USA: Infrastructureworld.com Launches new era in project Development, PR Newswire 2000.
USA: WelcomHome Now Shipping Worldwide—Welcom Delivers Project management Portal of the Future, Business Wire 2000.
USA: TLU's Mechanical System Get a Little TLC, UMI, Air Conditioning, Heating & Refrigeration News 2000.
USA: Apogee and MontaVista Announce Advanced Java Tools, Business Wire, 2000.
USA: Logisoft Forecasts 63% Revenue Increase in 2000, 150% in 2001, PR Newswire 2000.
USA: Motorola Chooses TeamPlay for Project Management Solution, MS Presswire Jun. 14, 2000.
USA: Motorola Chooses TeamPlay for Project Management Solution, Business Wire, Jun. 13, 2000.
USA: Applied Analytical Industries Launches Suite of Internet-Based Web Application, PR Newswire, Jul. 6, 2000.
USA: E-business Express Announces Partnership with Project Management Application Service Provider, PR Newswire, May 18, 2000.
USA: Computer Associates—Computer Associates Announces SuperProject 5.0 for Comprehensive . . . , M2 Presswire May 17, 2000.
USA: Advisory/TeamToolz to Preview First Web-Hosted Campaign Management Solution Designed Exclusively for . . . , Business Wire May 8, 2000.
USA: Advisory/TeamToolz to Preview First Web-Hosted Campaign Management Solution Designed Exclusively for Marketing and Advertising Agencies, Business Wire May 5, 2000.
USA: Build-Project Management Tools, Computer Database, Software Magazine, Apr. 1, 2000, p. 69.
USA: Teaming is Fundamental to Ensuring e-Business Success, PR Newswire, Mar. 29, 2000.
USA: PPD Discovery Launches the First Pass™ Program, PR Newswire Mar. 27, 2000.
USA: Project on Windows CE, Information Week, Mar. 20, 2000.
USA: Industry Leaders Joint Pacific Edge Software to Define the Project Management XML Schema, Business Wire Mar. 10, 2000.
USA: onProject.com Launches Powerful, Affordable Web-Based Business Collaboration and Project Management Service, PR Newswire Feb. 22, 2000.
USA: Project Management Professional—PMP—On-Line Development Program, Business Wire, Jan. 31, 2000.
USA: Projectrak Release 5.0, The Leading Lotus Notes and Domino Based Suite of Corporate Management Tools, Business Wire, Jan. 17, 2000.
USA: Same-Page.com Facilitates Project Management, IAC Trade and Industry Database, Fund Raising Management, Nov. 30, 1999.
USA: Pacific Edge Software Signs Contracts to provide Utilities with Portfolio Project Management, Business Wire, Nov. 30, 1999.
USA: Bigdog Solutions Inc. Launches Professional Services Automation Software, PR Newswire Europe, Nov. 10, 1999.
USA: SureTrak Project Manager From Primavera Named as Award Finalist, Business Wire Nov. 3, 1999.
USA: Merisel Open Computing Alliance Launches Online Marketing Project Management Service for Resellers, Business Wire, Oct. 4, 1999.
USA: Business Engine and CWB Team Up to Deliver Integrated Resource Management Solutions, Business Wire, Sep. 30, 1999.
USA: PlanView Offers 100% Web Software to Manage Projects and Workforce for the Enterprise, Business Wire Sep. 29, 1999.
USA: Oberon Extends Enterprise Application Integration to Projects Through PeopleSoft-Primavera Solution, PR Newswire, Aug. 3, 1999.
Vandersluis, Chris. USA: Microsoft Increases Stake in Project Management, UMI, Computing Canada (2000).
Vandersluis, Chris USA: Use Web Software for Projects, Or Die, Contractor 2000.

(56) References Cited

OTHER PUBLICATIONS

Vandersluis, Chris "Canada: Path of Least Resistance is the Root of All Problems" UMI Computing Canada (Jan. 26, 2001).
Vandersluis, Chris, Canada: Managing Staff and Resources Just Got Easier, UMI, Computing Canada, Oct. 15, 1999.
Wardell, Charles, USA: Up to Speed, UMI Builder (2000).
Wells, Amanda "New Zealand: Workflow Remedy May Stop Project Blowouts" Infotech May 2, 2001.
Wells, Amanda, New Zealand: Forest Research Management Boost, InfoTech, Nov. 15, 1999.
Weyuker et al. "Investing Metrics for Architectural Assessment" Jan. 1988, vol. 5, pp. 4-10.
Wohlin et al. "Abstract: Subjective Evaluation as a Tool for Learning from Software Project Success" Information and Software Technology, Nov. 15, 2000.
Yager, Tom. USA: A Little Change Can Go a Long Way, UMI, Infoworld (2000).
Karen A. Brown et al., "Project Performance and the Liability of Group Harmony", IEEE Transactions on Engineering management, vol. 37, No. 2, pp. 117-125, May 1990.
C. Wohlin et al., "Evaluation as a Tool for Learning from Software Project Success", Infomratino and Software Technology, vol. 42, No. 14, pp. 983-992 (2000).
Jefrey K. Pinto et al., "Critical Factors in Successful Project Implementation", IEEE Transactions on Engineering Management, vol. EM-34, No. 1, pp. 22-27, Feb. 1987.
James Borck, "USA: A New Look at Your Old Project Mangagement Methods Can Promote Your Advantages", Infoworld, Jan. 15, 2001.
Chip D'Angelo, "USA: Standardized Web Technologies Needed to Connect Highly Fragmented Construction Industry", Business Wire, Feb. 16, 2001.
Chris Vandersluls, "USA: Myth or Reality—Real-Time Project Management", Computing Canada, Nov. 24, 2000.
"USA: eWebSoft Announces AllTrack™ A Mobile Task Management/Work Flow Solution", PR Newswire, Dec. 4, 2000.
Chris Vandersluls, "Canada: Global Project Perspective Becomes Highly Desireable", Computing Canada, Sep. 1, 2000.
Chappell Brown, "USA: Web Tools Tie Together Development Teams", Techweb News, Feb. 14, 2001.

\* cited by examiner

METHOD AND APPARATUS FOR PREDICTING PROJECT OUTCOMES

CROSS REFERENCE TO RELATED APPLICATIONS

This application is a continuation of application Ser. No. 09/845,868, filed Apr. 30, 2001, which is incorporated herein by reference.

BACKGROUND OF THE INVENTION

The present invention relates generally to project management and, more particularly, to predicting the outcome of a project and taking corrective measures to increase the likelihood of success.

DESCRIPTION OF RELATED ART

As used herein, a 'project' is a task, typically an extensive task, undertaken by one or more people, typically a group of people. A project often represents an important commercial endeavour and may exist either standalone, or as part of a broader program of change comprised of multiple projects. A project typically seeks to secure a significant change to the status quo. This change frequently, though not always, relates to the way in which people, particularly employees, view and carry out their work tasks.

A project can be said to have been successful if, in the judgement of the appropriate stakeholders within the organization, the project is deemed to have fulfilled its agreed objectives and to have done so within any targeted timeframes and budgets.

Being able to reliably predict the outcome of a project before or during implementation would be very beneficial because if success can be demonstrated as either uncertain or unlikely, then corrective or remedial measures could be taken to increase the likelihood of success. No method exists in the prior art for easily and reliably predicting, and, readily enabling the manipulation of, project outcomes.

A need accordingly exists for a tool for reliably predicting project success, and readily enabling manipulation of project outcomes.

BRIEF SUMMARY OF THE INVENTION

In accordance with a preferred embodiment of the invention, a method and apparatus are provided for predicting the outcome of a project and, if needed, increasing its likelihood of success. Numerical values are assigned to a set of predetermined factors affecting the outcome of the project. The values are assigned based on a subjective evaluation of each factor with respect to the project. The factors include the duration of the project, the performance integrity of persons involved in implementing the project, the commitment of management to the project, the local commitment to the project and the effort required to implement the project. A score is calculated based on the values assigned to the factors. The score is applied based upon empirical benchmark data on prior project scores and outcomes, preferably across a range of geographies and industries, to determine the probability of success of the project. If desired, project changes can be implemented and new values assigned to one or more factors to improve the score and increase the probability of success of the project.

One advantage of this method is that it allows project planners and others to easily and reliably predict the likelihood of success of a project. The method assists those involved in the project in identifying and understanding what factors significantly affect the outcome of the project, and in making adjustments to increase the probability of successful implementation.

These and other features of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

Figure 1:
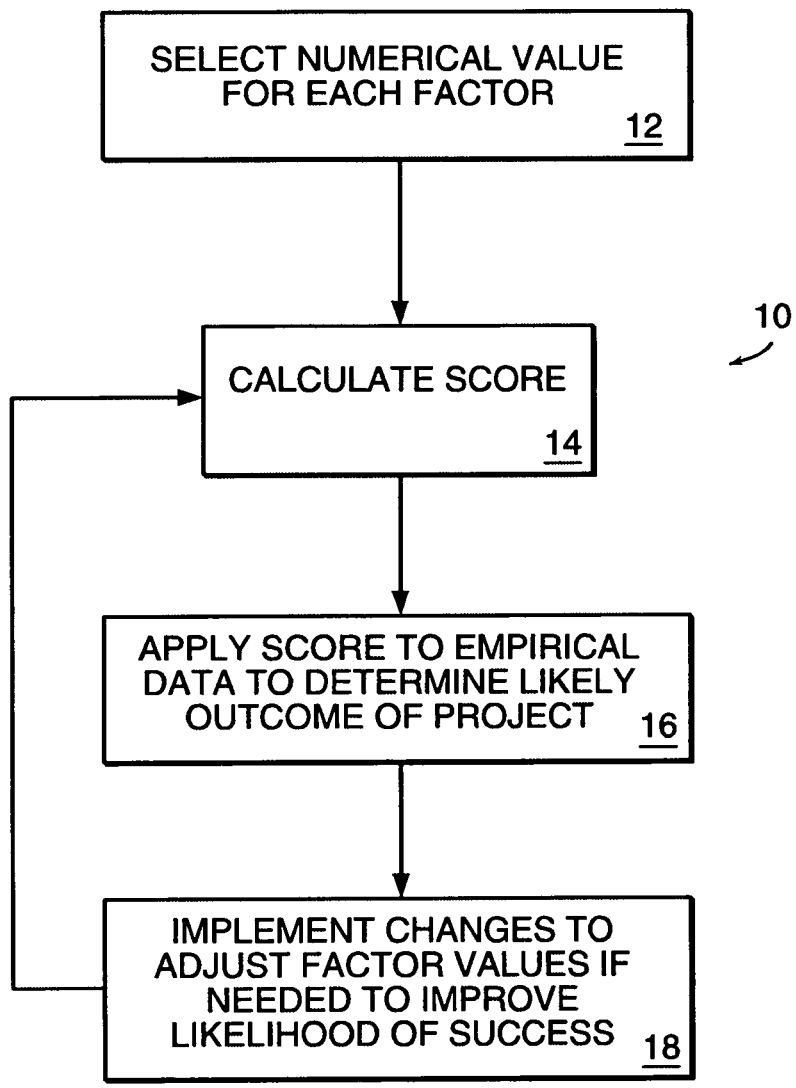
FIG. 1 is a flowchart generally illustrating the process of predicting project outcomes in accordance with the invention.

The present invention is directed to a tool for predicting the outcome of a project, and to assist in identifying any needed corrective changes to improve the likelihood of success. The tool provides an objective framework for subjective judgments made by senior managers, project managers, project team members and others, and uses empirical data to predict project outcomes.

Whether a project succeeds or fails is determined by a number of factors, which are also described herein as project "change elements." It has been discovered that four factors play a particularly important role in determining the outcome of a project. These factors are project duration (the "duration factor"), the performance integrity of the project team (the "integrity factor"), the organizational commitment to change (the "commitment factor"), and the additional local effort required during implementation (the "effort factor").

The duration factor generally refers to the duration or length of the project or the period of time until the next learning milestone, which is an event at which project progress is typically formally assessed against key performance measures. It has been found that smaller durations between learning milestones increase the likelihood of success.

This does not mean either that all lengthy projects are more likely to fail or that learning milestones can be trivially structured such that they occur at only very short intervals apart. Learning milestones are key points in the delivery of the project. They are typically defined within the project plan to lie at set dates and typically denote either the completion of major tasks or the integration of work from multiple areas. As such, it is frequently the case that learning milestones can not be realistically structured to occur less than a few months apart, though, if it is legitimately possible to do so, then this is more desirable. Lengthy projects per se are not more likely to fail than short projects. However, lengthy projects with poorly managed learning milestones are far more likely to fail.

The integrity factor generally refers to the performance "integrity" of the project team. The performance integrity of the project team is based on the configuration of its members and their overall skills and traits relative to the change process or project requirements. A team deemed to exhibit high performance integrity will broadly exhibit a set of attributes and skills, including: capable leadership, clarity of objectives, sufficient resourcing, challenging minds, people and team skills, self motivation, action bias and organizing skills.

The commitment factor generally refers to the organizational commitment to the project or change. That is the extent to which collectively the organization seeks to embrace the change. The commitment able to be achieved for major and transformational organizational change is an important consideration, since without appropriate attention to this component, the natural tendency of many organizations, will be to resist change. As will be discussed below, the commitment factor is preferably subdivided into local and senior components. The local component refers to the attitudes of the local area undergoing the change. The local area referred to includes the local management, supervisors, operational and support staff who will directly experience the change. The senior component refers to the perceived commitment of relevant senior management to the project. The consideration of perceived senior management commitment is an important element in gauging this dimension. The general organizational perception of senior management's commitment to major change projects is often less than what senior management would self assess themselves as being. Nevertheless, perceived commitment is more statistically causal in predicting project success.

The effort factor generally refers to the additional local effort, above the expected normal working requirements, needed during project implementation. The consideration of additional local effort is an important and often overlooked factor in successful implementation. Major change projects can rarely be implemented instantly. It is therefore important to recognize the additional effort required on the part of the area affected by the change, e.g., to effect the transition whilst simultaneously monitoring current operations up until the point when they are discontinued and the transition completed.

A continuum of possible outcomes can be inferred from application of these factors: from projects that are expected to succeed to those that are expected to fail. For example, a short project, led by a cohesive, highly skilled, motivated team, championed by senior management, and implemented in an area receptive to change, is highly likely to succeed. Conversely, a lengthy project, led by a poorly skilled, unmotivated team, opposed by senior management, and implemented in an area resistant to change, will likely fail. A large number of projects, perhaps most projects, however, will fall somewhere in the middle of the continuum, where success or failure is much more difficult to predict. For example, if the project is of short duration and has a good project team, but senior management commitment is variable and implementation requires a good deal of organizational effort, the likelihood of success may be difficult to determine. A tool for predicting project success in accordance with the invention can be used to assess the probable outcomes of projects like these and to identify remedial or corrective measures that can be taken to increase the probability of success.

FIG. 1 is a flowchart 10 that generally illustrates the process for predicting outcomes in accordance with the invention. At Step 12, numerical values are assigned to each of the factors discussed above.

The following is an example of a set of numerical values that can be used to define the change elements or factors for a project. Project managers and/or others knowledgeable on the project use their subjective judgments in assigning the values to each factor.

| | Step Function | |
|---|---|---|
| Element | Numerical Value | Description |
| (D) Duration Factor: duration of change either to completion or learning milestone | 1 | <2 months |
| | 2 | 2-4 months |
| | 3 | 4-8 months |
| | 4 | >8 months |
| (I) Performance integrity of project team | 1 | Very good |
| | 2 | Good |
| | 3 | Average |
| | 4 | Poor |
| ($C_1$) Senior management commitment to the change (as perceived by the organization) | 1 | Clearly communicate needs |
| | 2 | Seems to want success |
| | 3 | Neutral |
| | 4 | Reluctant |
| ($C_2$) Local commitment to the change | 1 | Eager |
| | 2 | Willing |
| | 3 | Reluctant |
| | 4 | Strongly Reluctant |
| (E) Local effort during implementation | 1 | <10% additional effort needed |
| | 2 | 10-20% additional effort needed |
| | 3 | 20-40% additional effort needed |
| | 4 | >40% additional effort needed |

At Step 14, the values selected for each factor are combined to generate a score. The score is preferably calculated using the following equation:

$$\text{Score} = D + 2I + 2C_1 + C_2 + E$$

Where D=duration factor, I=integrity factor, $C_1$=senior management commitment factor, $C_2$=local commitment factor, and E=local effort factor.

In the equation, a weighting of two is applied to the team performance integrity factor (I) and the senior management commitment factor ($C_1$), which have been found to produce particularly strong statistical correlation between the score for a project and its predicted outcome.

Figure 2:
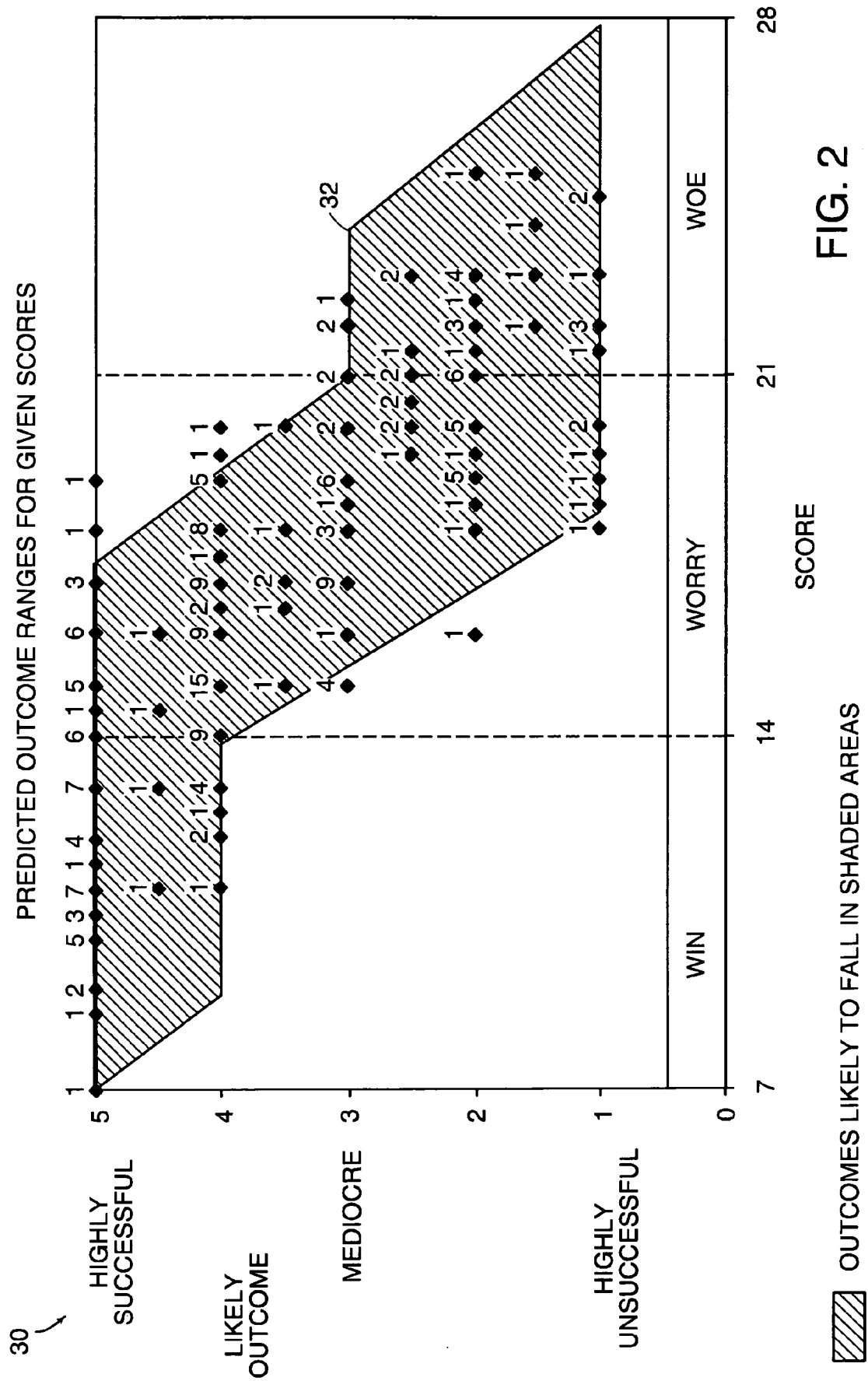
FIG. 2 is a graph of predicted outcome ranges for given scores based on empirical data.

A single score, ranging from 7 to 28 (when using the above example numerical values), can thereby be calculated for a project. At Step 16, the score is compared with empirical data on scores and outcomes of other projects. In particular, the score is preferably applied to a graph that plots scores generated by a benchmark database of other projects, against their success as shown, e.g., in FIG. 2. The FIG. 2 graph 30 includes a shaded area 32 where outcomes are most likely to fall. In the graph the numbers marked by diamonds refer to the number of prior projects (from a total of 225 such projects) having the indicated outcome for a specified score. Accordingly, a score calculated by the equation is positioned within the shaded area 32 in FIG. 2 to determine the likely corresponding outcome range of the project.

A score of less than 14 applied to the graph shaded area 32 would be deemed likely to be successful and hence would fall into a so-called 'Win Zone.' A score between 14 and 21 applied to the graph would correlate to an outcome that would be difficult to predict, and such projects would fall into a so-called 'Worry Zone.' Finally, projects with a score greater than 21 would fall into a so-called 'Woe Zone,' where outcomes are deemed very likely to be unsuccessful.

For projects falling in the worry or woe zones, remedial action can be taken before a project begins and/or at appropriate milestones during its implementation to improve the likelihood of project success. This is indicated by Step 18 in FIG. 1. The remedial action can be selected based on improving the numerical values of one or more factors. The score and likely outcome can then be again determined based on the revised factor values.

EXAMPLE

The following is an example of an outcome prediction analysis in accordance with the invention for a given project. The project in this example related to the restructuring of back offices of a large retail bank, which involved major changes to processes, behavior and organizational structures. The factor values were selected as follows:

The project was scheduled to last more than eight months, leading to a selection of D=4. The project team was deemed to have solid, but not spectacular performance integrity, leading to a selection of I=2. The project was thought to be in a general culture strongly reluctant to change with likely only moderate communication of senior management support, resulting in selections of $C_1$=2.5 and $C_2$=4. The project was estimated to require approximately 10-20% additional effort on the part of the organization during implementation, resulting in a selection of E=2.

Based on these values, the project score was calculated as follows:

$$\text{Score} = D + 2I + 2C_1 + C_2 + E$$
$$= 4 + 4 + 5 + 4 + 2$$
$$= 19$$

Figure 3:
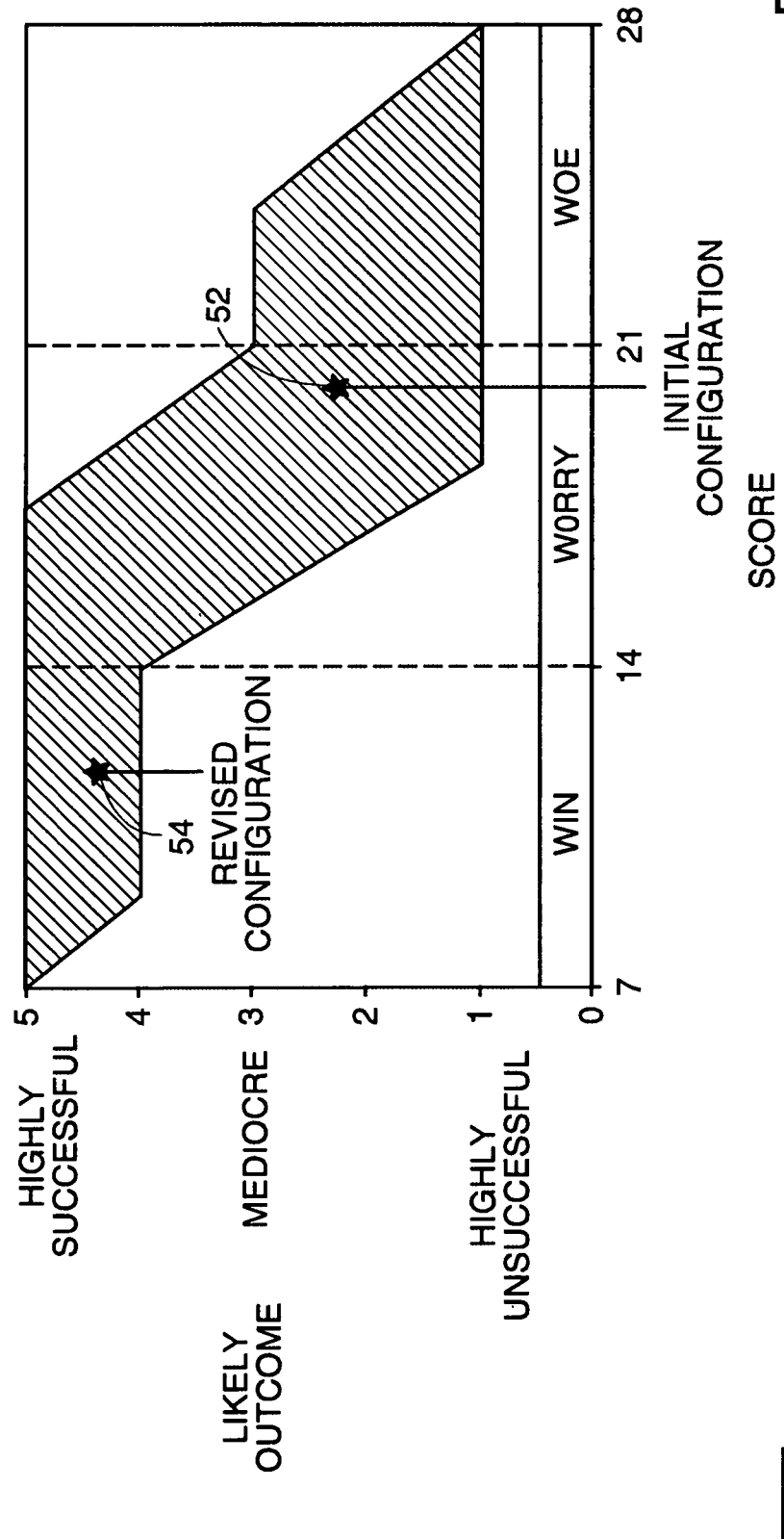
FIG. 3 is a graph similar to FIG. 2 illustrating outcome predictions before and after taking remedial measures to improve the likelihood of project success for an example project.

When the score was applied to empirical data as shown in the FIG. 3 graph 50, the predicted outcome fell within the Worry Zone (14<Score<21) as indicated at 52, generating serious concern about its chances of successful implementation. Remedial action was accordingly taken in three of the four elements of change in improve the score.

First, the project timeline was broken so that structured learning milestones occurred each 3 months. D accordingly decreased from 4 to 2.

Also, the selection, resourcing and configuration of the project team was significantly altered from what was originally planned. In particular, the team was carefully selected and resourced, and key regional and head office general managers were actively involved in configuration of teams. The team now included several high performing staff experienced in change management and 'on board' key back office managers with local knowledge and power. The value of I accordingly decreased from 2 to 1.

Consistency and effort on the part of senior management significantly enhanced the general perception of their commitment to the change. In particular, coordination of communications was marshaled through one post (Chief Manager—Organizational Effectiveness). Also, there was an assignment of a more senior and respected general manager to the project, both to signify importance and increase the likelihood of success. Also, a travelling "road show" was put on by management to explain the project and signal the need for success. $C_1$ accordingly decreased from 2.5 to 1.

Specific initiatives were employed to help improve the local commitment to the change, including local workshops and communications and making the envisaged change process. $C_2$ accordingly decreased from 4 to 3.

The project score was then recalculated:

$$\text{Score} = D + 2I + 2C_1 + C_2 + E$$
$$= 2 + 2 + 2 + 3 + 2$$
$$= 11$$

The improvement in score was significant, pushing the project into the Win Zone as indicated at 54 in FIG. 3. A subsequently highly successful implementation of the project confirmed the practical predictive value of the inventive approach.

The method steps described above (including, e.g., inputting numerical values for each factor, calculating a score, applying the score to empirical data) are implemented either manually or more preferably in a general purpose computer, e.g., as part of an Internet or Intranet based application. A representative computer is a personal computer or workstation platform that is, e.g., Intel Pentium®, PowerPC® or RISC based, and includes an operating system such as Windows®, OS/2®, Unix or the like. As is well known, such machines include a display interface (a graphical user interface or "GUI") and associated input devices (e.g., a keyboard or mouse).

The method steps are preferably implemented in software, and accordingly one of the preferred implementations of the invention is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

What is claimed:

1. A method for analyzing a project, comprising:
performing processing associated with assigning, utilizing a processing device in communication with a memory, values to each factor of a predetermined set of factors relating to the project;
performing processing associated with determining, utilizing the processing device, a score to represent a likely outcome of the project, the score comprising: D+2I+2C1C2+E, wherein D comprises a factor relating to the length of time to complete the project or to a learning milestone at which project progress is assessed, I comprises a factor relating to performance integrity of persons involved in implementing the project, C1 comprises a factor relating to the visible commitment of senior management to the project, C2 comprises a factor relating to local commitment to the project, and E comprises a factor relating to effort required to implement the project;

wherein the factors of the score are weighted as follows: for D, the weight given to D corresponds to how short the duration of the project or the learning milestone is; for I, the weight given to I corresponds to how good the performance integrity of the persons involved in implementing the project is; for C1, the weight given to C1 corresponds to how supportive senior management is of the project; for C1, the weight given to C2 corresponds to how supportive locals are of the project; and for E, the weight given to E corresponds to how much local effort is required to implement the project;

performing processing associated with accepting, by the processing device, statistical data relating outcomes of other projects, the other projects ranging across multiple industries;

performing processing associated with deriving, by the processing device, using the statistical data, score ranges associated with outcome categories; and performing processing associated with comparing, by the processing device, the score to the score ranges derived from the statistical data to identify into which score range and outcome category the score falls, thereby associating the determined score with an outcome category as a likely outcome of the project.

2. The method of claim 1, further comprising adjusting the value for at least one factor to improve the score and increase the probability of a successful implementation of the project.

3. The method of claim 1 wherein the score is solely dependent on the factors D, I, C1, C2 and E.

4. The method of claim 1 wherein a set of statistically significant empirical data relating the outcomes of the other projects and respective scores is determined for the other projects, and wherein the statistically significant empirical data is used to derive the score ranges associated with particular outcome categories.

5. The method of claim 4 wherein the set of statistically significant empirical data is obtained from a substantial number of major projects.

6. The method of claim 4 wherein the set of statistically significant empirical data is represented in a graph.

7. The method of claim 6 further comprising plotting the score determined in the graph.

8. The method of claim 1 wherein areas of deficiency to be addressed to increase the probability of a successful implementation of the project are identifiable.

9. A system comprising:

a processing device in communication with a memory, wherein the processing device is configured for:

performing processing associated with assigning, using the processing device, values to each factor of a predetermined set of factors relating to the project, wherein the predetermined set of factors is the same for different projects, wherein the different projects range across multiple industries;

performing processing associated with determining, using the processing device, a score to represent a likely outcome of the project, the score comprising: D+2I+2C1+C2+E, wherein D comprises a factor relating to the length of time to complete the project or to a learning milestone at which project progress is assessed, I comprises a factor relating to performance integrity of persons involved in implementing the project, C1 comprises a factor relating to the visible commitment of senior management to the project, C2 comprises a factor relating to local commitment to the project, and E comprises a factor relating to effort required to implement the project;

wherein the factors of the score are weighted as follows: for D, the weight given to D corresponds to how short the duration of the project or the learning milestone is; for I, the weight given to I corresponds to how good the performance integrity of the persons involved in implementing the project is; for C1, the weight given to C1 corresponds to how supportive senior management is of the project; for C1, the weight given to C2 corresponds to how supportive locals are of the project; and for E, the weight given to E corresponds to how much local effort is required to implement the project:

performing processing associated with accepting, by the processing device, statistical data relating outcomes of other projects, the other projects ranging across multiple industries;

performing processing associated with deriving, by the processing device, using the statistical data, score ranges associated with outcome categories; and performing processing associated with comparing, by the processing device, the score to the score ranges derived from the statistical data to identify into which score range and outcome category the score falls, thereby associating the determined score with an outcome category as a likely outcome of the project.

10. The system of claim 9 further comprising adjusting the value for at least one factor to improve the score and increase the probability of a successful implementation of the project.

11. The system of claim 9 wherein a set of statistically significant empirical data relating the outcomes of the other projects and respective scores is determined for the other projects, and wherein the statistically significant empirical data is used to derive the score ranges associated with particular outcome categories.

12. The system of claim 11 wherein the set of statistically significant empirical data is obtained from a substantial number of major projects.

13. The system of claim 11 wherein the set of statistically significant empirical data is represented in a graph.

14. The system of claim 13, wherein the score is also plotted on the graph.

15. The system of claim 9 wherein areas of deficiency to be addressed to increase the probability of a successful implementation of the project are identifiable.

16. The system of claim 9 wherein the score is solely dependent on the factors D, I, C1, C2 and E.

17. A computer program product having a plurality of instructions that when executed by a processing device in communication with a memory, cause the processing device to:

perform, processing associated with assigning values, using the processing device, to each factor of a predetermined set of factors relating to the project, wherein the predetermined set of factors is the same for different projects, wherein different projects range across multiple industries;

perform processing associated with determining, using the processing device a score to represent a likely outcome of the project, the score comprising: D+2I−2C1+C2+E, wherein D comprises a factor relating to the length of time to complete the project, or to a learning milestone at which project progress is assessed. I comprise a factor relating to performance integrity of persons involved in implementing the project. C1 comprises a factor relating to the visible commitment of senior management to the project, C2 comprises a factor relating to local commitment to the project, and E comprises a factor relating to effort required to implement the project;

wherein the factors are weighted as follows: for D, the weight given to D corresponds to how short the duration of the project or the learning milestone is: for I, the weight give I corresponds to how good the performance integrity of the persons involved in implementing the project is: for C1, the weight given to C1 corresponds to how supportive senior management is of the project; for C1, the weight given to C2 corresponds to how supportive locals are of the project: and for E, the weight given to E corresponds to bow much local effort is required to implement the project;

perform processing associated with accepting, by the processing device, statistical data relating outcomes of other projects ranging across multiple industries;

perform processing associated with deriving, by the processing device, using the statistical data, score ranges associated with outcome categories: and perform processing associated with comparing, by the processing device, the score to the ranges derived from the statistical data to identify into which score range and outcome category the score falls, thereby associating the determined score with an outcome category as a likely outcome of the project.

18. The computer program product of claim 17 further comprising instructions that cause the processor to adjust the value for at least one predetermined factor to improve the score and increase the probability of success.

19. The computer program product of claim 17 wherein a set of statistically significant empirical data relating the outcomes of the other projects and respective scores is determined for the other projects, and wherein the statistically significant empirical data is used to derive the score ranges associated with particular outcome categories.

20. The computer program product of claim 19 wherein the set of statistically significant empirical data is obtained from a substantial number of major projects.

21. The computer program product of claim 19, wherein the set of statistically significant empirical data is represented in a graph.

22. The computer program product of claim 21 wherein the score is plotted in the graph.

23. The computer program product of claim 17 wherein areas of deficiency to be addressed to increase the probability of a successful implementation of the project are identifiable.

24. The computer program product of claim 17 wherein the score is solely dependent on the factors D, I, C1, C2 and E.

* * * * *